Figure 1:
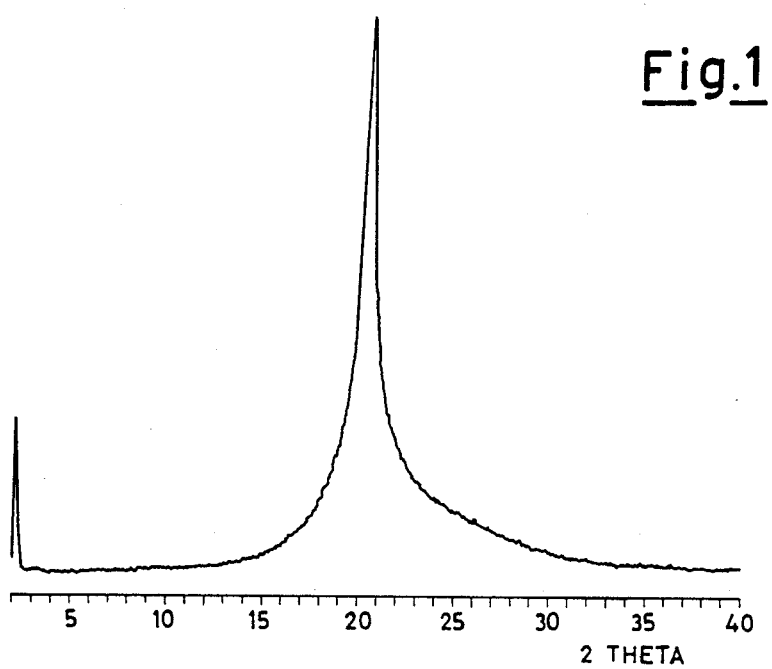

United States Patent [19]

Roggero et al.

[11] Patent Number: 4,963,642
[45] Date of Patent: Oct. 16, 1990

[54] THERMOTROPIC COPOLYESTER AND PROCESS FOR PREPARING IT AND USE THEREOF

[75] Inventors: Arnaldo Roggero; Ugo Pedretti, both of Milan; Pier L. Magagnini, Riglione; Enrico Montani; Hassan A. Hakemi, both of Milan; Bruno Bresci, Livorno; Francesco P. La Mantia, Palermo, all of Italy

[73] Assignee: Eniricerche S.p.A., Milan, Italy

[21] Appl. No.: 358,167

[22] Filed: May 30, 1989

[30] Foreign Application Priority Data

Jun. 8, 1988 [IT] Italy .............................. 20886 A/88

[51] Int. Cl.$^5$ ...................... C08G 63/00; C08G 63/02
[52] U.S. Cl. .................................. 528/190; 525/425; 525/439; 525/444; 525/450; 528/176; 528/193; 528/271; 528/480; 528/481; 528/483
[58] Field of Search ............... 528/176, 190, 193, 271, 528/480, 481, 483; 525/425, 439, 444, 450

[56] References Cited

U.S. PATENT DOCUMENTS 4,390,681 6/1983 Deex .................................. 528/193

Primary Examiner—Harold D. Anderson
Assistant Examiner—T. Mosley
Attorney, Agent, or Firm—Oblon, Spivak, McClelland, Maier & Neustadt

[57] ABSTRACT

A thermotropic copolyester, having a liquid-crystalline mesophase of nematic structure within a desired range of temperatures, contains units derived from:
(a) a saturated aliphatic bicarboxy acid;
(b) 4,4'-dihydroxy-biphenyl;
(c) p-hydroxybenzoic acid; and
(d) 2,6-hydroxynaphthoic acid.

Such a thermotropic copolyester displays improved characteristics, in particular as regards its extensional modulus and its tensile strength, when is used as a self-reinforced material, or as a reinforcer material for traditional thermoplastic polymers.

12 Claims, 4 Drawing Sheets

THERMOTROPIC COPOLYESTER AND PROCESS FOR PREPARING IT AND USE THEREOF

The present invention is concerned with a thermotropic copolyester and with the process for preparing it.

The invention is also concerned with the use of such a thermotropic copolyester as a self-reinforced material, or as a reinforcing material for the traditional thermoplastic polymers.

In the art, polymers are known, which are capable of maintaining a high degree of intermolecular order in the liquid state, and shown hence the typical behaviour of liquid crystal.

In particular, two classes of such polymers are known, and, more particularly, the lyotropic polymers, which originate ordered systems in solution, and the thermotropic polymers, which originate ordered systems in the molten state.

Many of the thermotropic polymers known from the prior art are of polyester nature with a completely aromatic structure.

Furthermore, from the prior art, also some thermotropic polymers of polyester nature are known, in whose chain rigid units (of aromatic character) are bonded to each other by flexible segments (of aliphatic nature), such as, e.g., the thermotropic polyesters which contain in their macromolecule units derived from a saturated aliphatic bicarboxy acid and 4,4''-dihydroxybiphenyl, described by Asrar et al. in Journal of Polymer Science, Polymer Physics Ed. 21, 1119 (1983) and by Krigbaum et al. in Macromolecules, 16, 1271 (1983).

In the U.S. patent application No. 167.106 filed on Mar. 11, 1988, a thermotropic copolyester is disclosed, which contains in its macromulecule units deriving from p-hydroxy-benzoic acid, associated to those deriving from a saturated bicarboxy aliphatic acid and 4,4'-dihydroxy-biphenyl. Such a copolyester, which shows a nematic structure of its liquid-crystalline phase, is useful as a self-reinforced material, or as a reinforcing material for such traditional thermoplastic materials as polyethylene terephthalate, polybutylene terephthalate, polycarbonate and nylon.

According to the specification of the above cited patent application, the copolyesters which contain comparably high percentages of units deriving from p-hydroxy-benzoic acid show a crystalline segregation of blocks deriving from such an unit, and this is an undesired characteristic.

The present Applicant has found now that the introduction of units deriving from 2,6-hydroxy-naphthoic acid in the copolyester of the above cited Italian patent application makes it possible the drawbacks deriving from phase segregation to be overcome, or at least alleviated.

The present Applicant found also that the introduction of such units makes it possible the characteristics of the copolyester to be improved, in particular as regards its extensional modulus and its tensile strength, so that the same copolyester is rendered still more useful as a self-reinforced material, and as a reinforcing material.

In accordance therewith, the present invention is concerned with a thermotropic copolyester having a nematic structure of the liquid-crystalline phase within a desired range of mesophase temperatures, which contains in its macromolecule units deriving from:

(a) a saturated aliphatic α,ω-bicarboxy acid:

wherein n is comprised within the range of from 3 to 8;

(b) 4,4'-dihydroxybiphenyl:

(c) p-hydroxybenzoic acid:

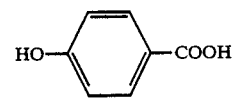

(d) 2,6-hydroxy-naphthoic acid:

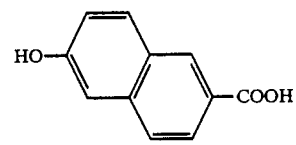

within the following ratios of the units to one another:

(a)/(b)=1
[(c)+(d)]/(a)=1-8
(d)/[(c)+(d)]=0.1-1.

The copolyester according to the present invention preferably shows the following values of the ratios of the units to one another:

(a)/(b)=1
[(c)+(d)]/(a)=2-6
(d)/[(c)+(d)]=0.2-0.6.

Examples of saturated aliphatic α,ω-bicarboxy acids useful for the purpose according to the present invention are sebacic acid, suberic acid and adipic acid.

Among these, sebacic acid is preferred.

The copolyesters according to the present invention can be prepared by copolymerizing, in the molten state, a mixture of the saturated aliphatic dicarboxy acid, 4,4'-diacyloxybiphenyl, para-acyloxybenzoic acid and 2,6-acyloxy-naphthoic acid.

The preferred 4,4'-diacyloxybiphenyl is 4,4'-diacetyloxybeiphenyl, which can be obtained by reacting 4,4'-dihydroxybiphenyl with acetic anhydride.

The preferred para-acyloxybenzoic acid is para-acetoxybenzoic acid, which can be obtained by reacting para-hydroxybenzoic acid with acetic anydride.

The preferred 2,6-acyloxy-naphthoic acid is p-acetoxy naphthoic acid, which can be obtained by means of the reaction between 2,6-hydroxy-naphthoic acid and acetic anhydride.

The reaction of copolymerization is carried out in the presence of such catalysts as dialkyl-tin oxides, diaryl-tin oxides, titanium dioxide, antimony dioxide and carboxylates of alkali metals or of alkali-earth metals. The preferred catalyst is sodium acetate. The use of a catalyst amount comprised within the range of from 0.01 to 1 part by weight per each 100 parts by weight of the monomers submitted to polymerization is generally advantageous.

The copolymerization is carried out by making temperature vary from about 190° C. up to an end temperature which may be as high as 290° C., and which normally is of approximately 270° C.

During the copolymerization, carboxy acid—in the preferred form of practical embodiment acetic acid—develops and is removed from the reaction mixture.

It is advantageous to operate under reduced pressure, at least during the end step of the copolymerization, in order to eliminate the reaction byproduct carboxy acid, and other possible low-molecular weight compounds, so as to increase the polymerization degree up to the desired level.

The required times for the polymerization to take place may generally vary within the range of from 3 to 11 hours, and, preferably, of from 5 to 7 hours.

According to a preferred form of practical embodiment of the present invention, the saturated alifatic bicarboxy acid, 4,4'-dihydroxy-biphenyl, p-hydroxybenzoic acid and 2,6-hydroxy-naphthoic acid are charged to the polymerization reactor together with the catalyst and acetic anhydride in an amount at least equivalent to the hydroxy functionalities of the reactants. The reaction mixture is then heated at temperatures of the order of 140° C. until the reactants are dissolved and the acetylation of the hydroxy functionalities is accomplished. The copolymerization is then carried out under the above indicated conditions.

At the end of the copolymerization, the copolyester can be submitted to a purification, for example by means of the prolonged extraction with organic solvents at their boiling temperature, or by precipitation from solutions in organic solvents.

The so obtained copolyester contains the monomeric units in mutual proportions equal to, or substantially equal to, those of the monomers submitted to the copolymerization.

Such a copolyester has values of intrinsic viscosity comprised within the range of from 1.5 to 5 dl/g when this determination is carried out at 60° C. in solution in pentafluorophenol at a concentration of 0.1 g/dl.

The structural characterization of the copolyester was carried out on samples in powder form by means of X-ray diffraction, using a Philips vertical goniometer equipped with impulse-counting electronics, and using Cu Kα radiation.

The X-ray diffraction spectrum is generally characterized by the presence of one single, very intense, relatively broad peak in the 20° angle region comprised within the range of from 19° to 21° (FIGS. from 1 to 6). The angular position of such a peak is slightly variable with varying copolyester composition, and, in particular, increases with increasing concentrations of (c) and (d) units.

Figure 7:
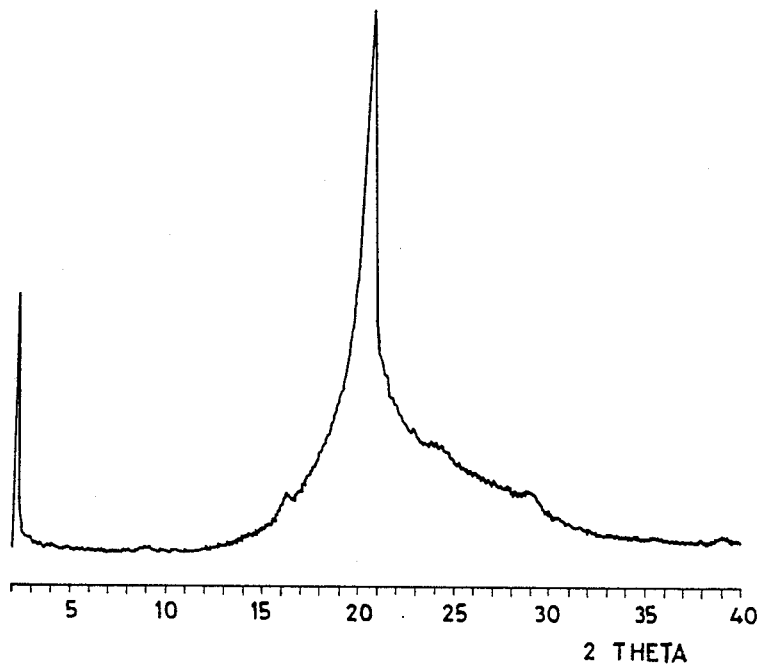

The spectra of the copolyesters with (d)/[(c)+(d)] ratios<0.2 and with [(c)+(d)]/(a) ratios comprised within the range of from 5 to 8 show, additionally to the above mentioned intense peak, the reflexions typical for crystalline sequences of (c) units (FIG. 7).

The copolyester according to the present invention shows a temperature of transition from the crystal phase to the nematic mesophase comprised within the range of values of from 140° C. to 230° C. as a function of the composition of the copolymer. In any cases, the temperature of transition from the nematic mesophase to the isotropic state is higher than 310° C. The crystal-mesophase and mesophase-isotropic state transitions were determined by differential scanning calorimetry (DSC), using a METTLER TA 3000 equipment and by means of an optical microscope in polarized light equipped with heating stage.

The thermotropic copolyester according to the present invention having the above indicated whole of characteristics can be submitted to a thermal treatment at temperatures lower than the melting temperatures, and under reduced pressure, preferably under a blanketing flow of an inert, anhydrous gas.

More particularly, such a treatment can be carried out at temperatures comprised within the range of from 130° C. to 210° C., under a pressure of down to $10^{-4}$ torr and for times generally comprised within the range of from 1 to 20 hours.

Due to this treatment, the crystal-nematic mesophase transition temperature of the copolyester gradually increases with increasing treatment time, until a constant, or substantially constant, value is reached. The maximum increase in said transition temperature is of about 40° C. The so treated copolyester generally shows values of intrinsic viscosity which are of the order of 5 dl/g, when the determination is carried out at 60° C. in solution in pentafluorophenol at a concentration of 0.1 g/dl.

Such a treatment is thought to cause an increase in the average molecular weight of the copolyester.

The thermotropic copolyester according to the present invention can be transformed by means of usual processing techniques, such as injection-moulding and extrusion. By means of the extrusion technique, preferential orientations in flow direction can be induced, which can be enhanced by means of a stretching.

As regards its mechanical characteristics, the extruded and stretched copolyester shows values of extensional modulus normally comprised within the range of from 20 to 60 GPa, and values of tensile strengths comprised within the range of from 500 to 1,200 MPa.

The copolyesters of the present invention can also be used as reinforcing agents for traditional thermoplastic materials, such as, e.g., polycarbonate, polybutylene terephthalate and nylon, at concentrations corresponding to from 5 to 30 parts by weight of copolyester per each 100 parts by weight of thermoplastic polymer. The improvement in the mechanical properties of the thermoplastic material induced by means of the addition of the copolyester can be evaluated to be of round 10–40% as regards the value of extensional modulus, and of round 10–40% as regards the tensile strength.

Furthermore, the copolyester induces a significant reduction in the viscosity of the blend, making it possible the spinning to be carried out at temperatures from 30° to 60° C. lower than as usually required for the transformation of the matrix, thus enabling the high-temperature stretching step to be exploited at its best.

The following experimental examples are reported in order to better illustrate the invention.

EXAMPLE 1

To a reactor of 2 liters of capacity, equipped with a stirrer connected with a Brignole seal, a tube for nitrogen inlet and a condenser, the following reactants:
sebacic acid: 121.2 g (0.6 mol)
4,4'-dihydroxybiphenyl: 111.7 g (0.6 mol)
p-hydroxybenzoic acid: 165.7 g (1.2 mol)
2,6-hydroxynaphthoic acid: 56.5 g (0.3 mol)
acetic anhydride: 306 g (3 mol)
sodium acetate: 0.15 g (0.0018 mol) are charged.

The reactant mixture is heated to 140° C. with an oil bath and is kept at this temperature for 2 hours, with stirring.

Under these conditions, the complete dissolution of the reactants and the acetylation of the hydroxy groups take place.

After replacing the oil bath with a molten-salts bath, the reaction temperature is gradually increased up to 270° C. within a 5-hour time, and under a slow nitrogen flow. The excess of acetic anhydride and the acetic acid formed during the acetylation reaction and the polycondensation are distilled off and condensed inside a test tube maintained at −78° C. with dry carbon dioxide. During this time period, when the temperature reaches values of from 220° C. up to 230° C., the reaction mass turns into opalescent and the viscosity starts to increase with increasing temperature.

The nitrogen flow is substantially discontinued, and the molten material is submitted, still at 270° C., to a pressure reduction down to an end vacuum of $10^{-2}$ mmHg$_e$. The reaction continues under these conditions for a further 2 hours; then the reaction mass is cooled, still under vacuum, down to room temperature.

The obtained copolyester is mixed with dry carbon dioxide, and is finely ground inside a blade mill.

The intrinsic viscosity (I.V.) of the copolyester is of about 1.9 dl/g when measured at 60° C. in solution in pentafluorophenol at a concentration of 0.1 g/dl.

The copolyester, having the X-ray diffraction spectrum shown in FIG. 1, displays a crystal-nematic mesophase transition at 218° C., observed by means of DSC analysis.

The copolyester is then submitted to a heating at the constant temperature of 190° C., under a vacuum of $10^{-2}$ mmHg. Owing to this treatment, the temperature of crystal-nematic mesophase transition gradually increases with increasing heating time until a constant value of 257° C. is reached, after 20 hours. Such a copolyester has a value of intrinsic viscosity of about 5 dl/g, determined as hereinabove said.

EXAMPLE 2

To the same reactor as of Example 1, the following reactants:
sebacic acid: 121.2 g (0.6 mol)
4,4'-dihydroxybiphenyl: 111.7 g (0.6 mol)
p-hydroxybenzoic acid: 165.7 g (1.2 mol)
2,6-hydroxynaphthoic acid: 113 g (0.6 mol)
acetic anhydride: 336.6 g (3.3 mol)
sodium acetate: 0.17 g (0.0021 mol)
are charged.

The process is carried out in the same was as of Example 1 and a copolyester is obtained, which has an intrinsic viscosity (I.V.) of about 1.4 dl/g when measured at 60° C. in solution in pentafluorophenol at a concentration of 0.1 g/dl.

Figure 2:
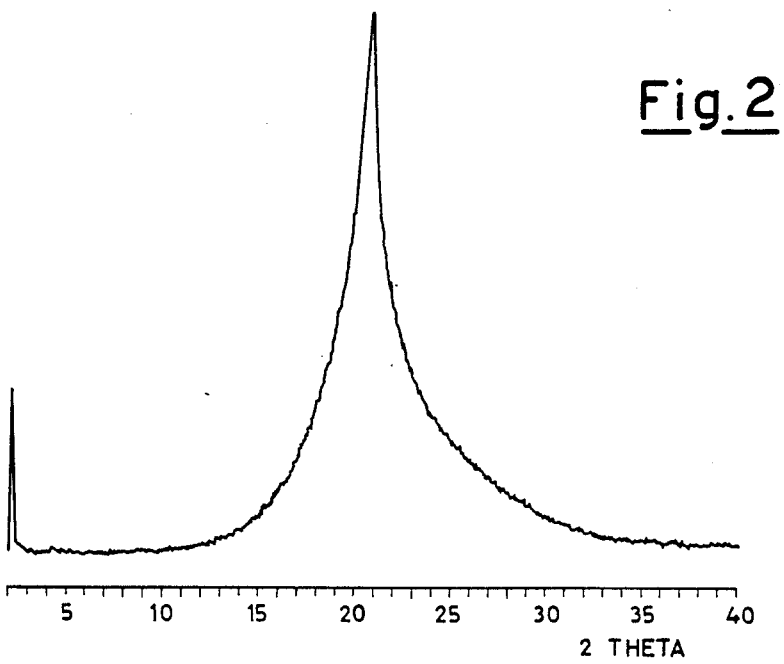

The copolyester, having the X-ray diffraction spectrum shown in FIG. 2, displays a crystal-nematic mesophase transition of 197° C. (determination by means of DSC).

The copolyester is then submitted to a heating at the constant temperature of 170° C., under a vacuum of $10^{-2}$ mmHg. Owing to this treatment, the temperature of crystal-nematic mesophase transition gradually increases with increasing heating time until a constant value of 222° C. is reached, after 20 hours. Such a copolyester has a value of intrinsic viscosity of about 4 dl/g, determined as hereinabove said.

EXAMPLE 3

To the same reactor as of Example 1, the following reactants:
sebacic acid: 121.2 g (0.6 mol)
4,4'-dihydroxybiphenyl: 111.7 g (0.6 mol)
p-hydroxybenzoic acid: 165.7 g (1.2 mol)
2,6-hydroxynaphthoic acid: 226 g (1.2 mol)
acetic anhydride: 397.8 g (3.9 mol)
sodium acetate: 0.21 g (0.0026 mol)
are charged.

The process is carried out in the same way as of Example 1 and a copolyester is obtained, which has an intrinsic viscosity (I.V.) of about 2.1 dl/g, as determined at 60° C. in solution in pentafluorophenol at a concentration of 0.1 g/dl.

Figure 3:
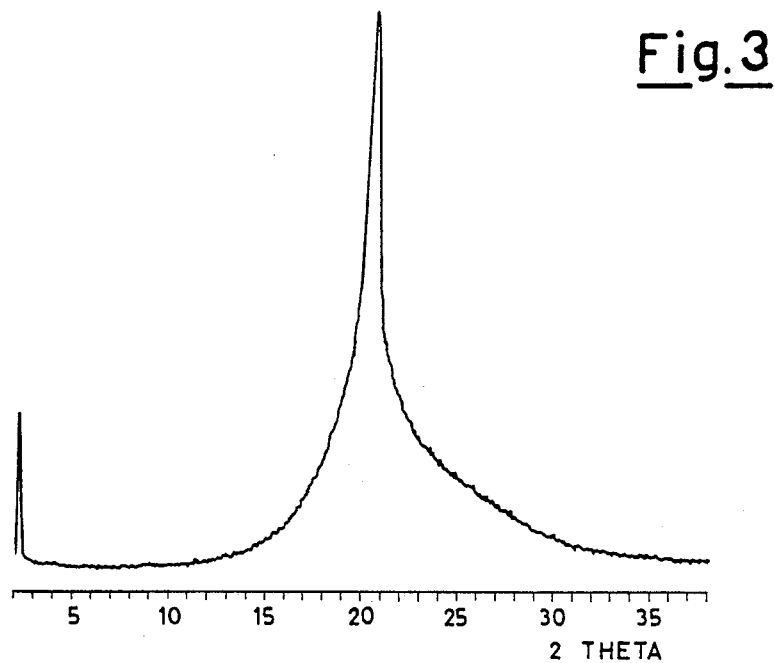

The copolyester displays a crystal-nematic mesophase transition at 166° C. (determination by means of DSC), and its X-ray diffraction spectrum is shown in FIG. 3.

EXAMPLE 4

To the same reactor as of Example 1, the following reactants:
sebacic acid 121.2 g (0.6 mol)
4,4'-dihydroxybiphenyl 111.7 g (0.6 mol)
p-hydroxybenzoic acid 248.5 g (1.8 mol)
2,6-hydroxynaphthoic acid 113 g (0.6 mol)
acetic anhydride 367.2 g (3.6 mol)
sodium acetate 0.20 g (0.0024 mol)
are charged.

The process is carried out in the same way as of Example 1 and a copolyester is obtained, which has an intrinsic viscosity (I.V.) of about 1.8 dl/g, as measured at 60° C. in solution in pentafluorophenol at a concentration of 0.1 g/dl.

Figure 4:
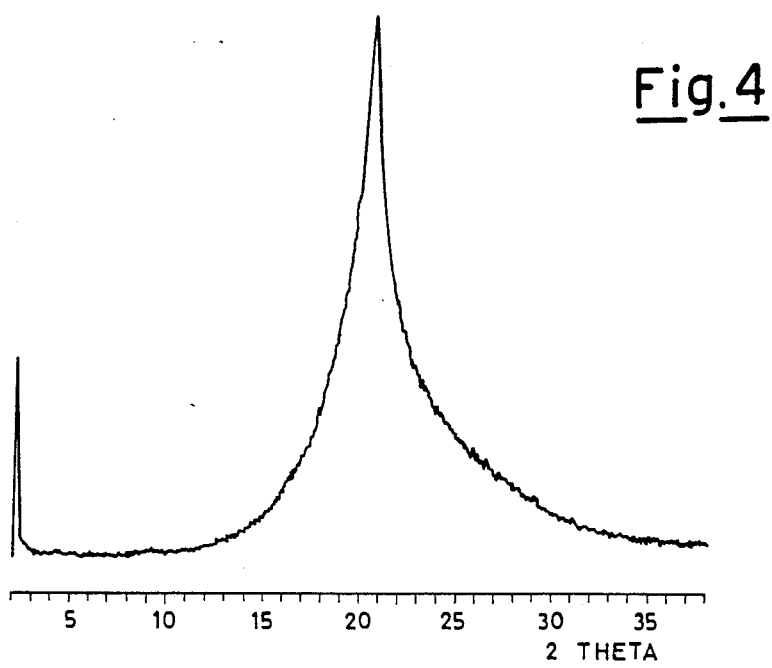

The copolyester displays a crystal-nematic mesophase transition at 196° C. (determination by means of DSC), and its X-ray diffraction spectrum is shown in FIG. 4.

The copolyester is then submitted to a heating at the constant temperature of 170° C., under a vacuum of $10^{-2}$ mmHg. Owing to this treatment, the temperature of crystal-nematic mesophase transition gradually increases with increasing heating time until a constant value of 212° C. is reached, after 15 hours. Such a copolyester has a value of intrinsic viscosity of about 3.5 dl/g, determined as hereinabove said.

EXAMPLE 5

To the same reactor as of Example 1, the following reactants:
sebacic acid: 121.2 g (0.6 mol)
4,4'-dihydroxybiphenyl: 111.7 g (b 0.6 mol)
p-hydroxybenzoic acid: 248.5 g (1.8 mol)
2,6-hydroxynaphthoic acid: 226 g (1.2 mol)
acetic anhydride: 469.2 g (4.6 mol)
sodium acetate: 0.23 g (0.0028 mol)
are charged.

The process is carried out in the same way as of Example 1 and a copolyester is obtained, which has an intrinsic viscosity (I.V.) of about 2 dl/g when determined at 60° C. in solution in pentafluorophenol at a concentration of 0.1 g/dl.

Figure 5:
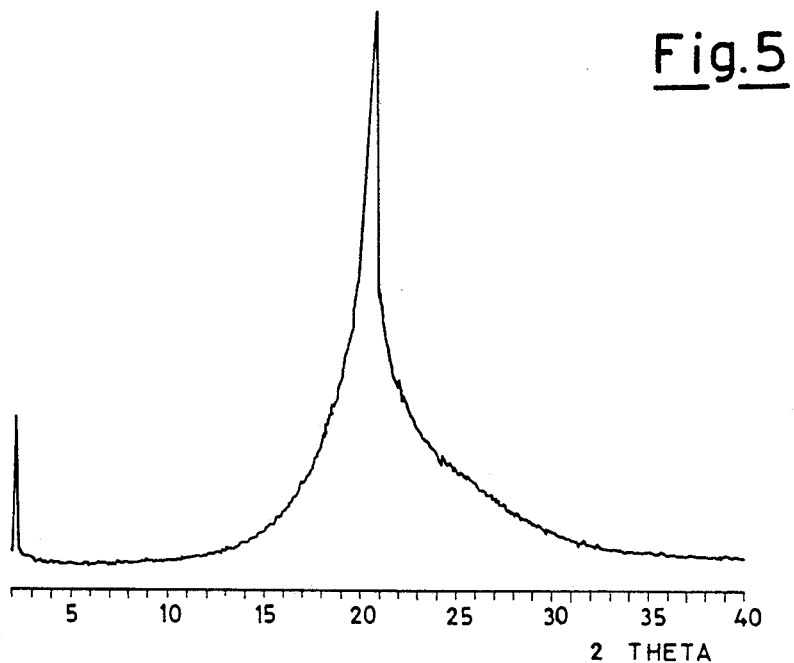

The copolyester displays a crystal-nematic mesophase transition at 168° C. (determination by means of DSC), and its X-ray diffraction spectrum is reported in FIG. 5.

EXAMPLE 6

To the same reactor as of Example 1, the following reactants:
sebacic acid: 121.2 g (0.6 mol)
4,4'-dihydroxybiphenyl: 111.7 g (0.6 mol)
p-hydroxybenzoic acid: 331.4 g (2.4 mol)
2,6-hydroxynaphthoic acid: 226 g (1.2 mol)
acetic anhydride: 530.4 g (5.2 mol)
sodium acetate: 0.26 g (0.0032 mol)
are charged.

The process is carried out in the same way as of Example 1 and a copolyester is obtained, which has an intrinsic viscosity (I.V.) of about 1.9 dl/g, as determined at 60° C. in solution in pentafluorophenol at a concentration of 0.1 g/dl.

Figure 6:
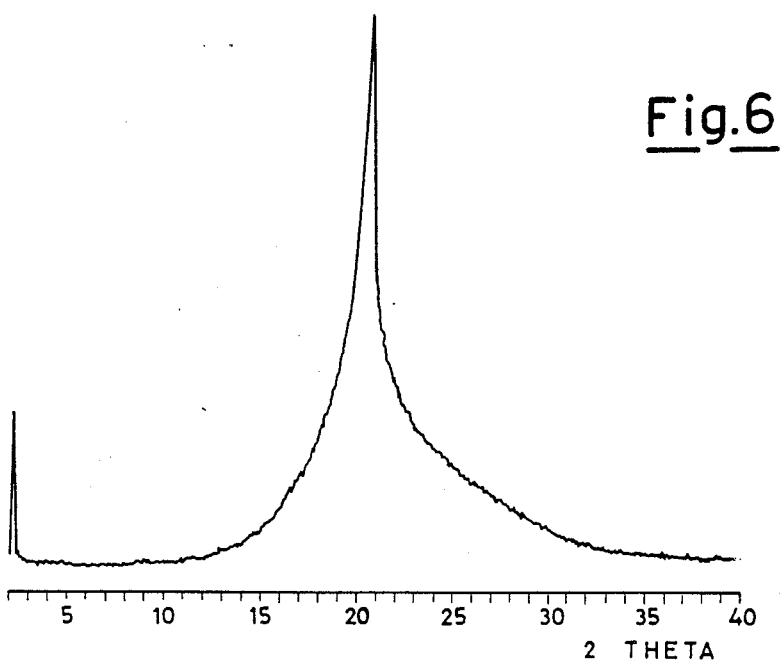

The copolyester displays a crystal-nematic mesophase transition at 177° C. (determination by means of DSC), and its X-ray diffraction spectrum is reported in FIG. 6.

The copolyester is then submitted to a heating at the constant temperature of 150° C., under a vacuum of $10^{-2}$ mmHg.

Owing to this treatment, the temperature of crystal-nematic mesophase transition gradually increases with increasing heating time until a constant value of 186° C. is reached, after 14 hours.

Such a copolyester has a value of intrinsic viscosity of about 3.8 dl/g, determined of hereinabove said.

EXAMPLE 7

The copolyester obtained by the procedure as disclosed in Example 1 is submitted to a process of spinning and stretching by using a Rheoscope 1000 Viscometer by CEAST, equipped with the tensile module, and with a conical nozzle with an half-angle of 30° C., a diameter of 0.3 mm and a Length/Diameter (L/D) ratio of 20. The process is carried out at a temperature of 280° C., with a stretching ratio comprised within the range of from 10 to 50.

The so obtained fibres have extensional moduli comprised within the range of from 15 to 35 GPa, tensile strengths comprised within the range of from 500 to 1,100 MPa and elongations at break comprised within the range of from 3 to 1%. The mechanical properties are evaluated by using the Instron Mod. 6025 instrument, with an elongation speed of 0.5 $min^{-1}$,

EXAMPLE 8

The copolymer obtained in Example 5 is submitted to spinning in the same equipment as of example 7. The process is furthermore carried out at a temperature of 200° C., with stretching ratios comprised within the range of from 30 to 100.

The so obtained fibres have extensional moduli comprised within the range of from 20 to 40 GPa, tensile strengths comprised within the range of from 300 to 800 MPa and elongations at break comprised within the range of from 2 to 1%.

EXAMPLE 9

The copolyester obtained in Example 1 and polycarbonate are blended in the ratio of 20:80 by weight, in the molten state, on a Brabender mixer, at a temperature of 280° C. The so obtained blend is finely ground in the presence of dry ice and, after being submitted to a drying for 4 hours at 140° C. inside a ventilated oven, is compression-moulded at 280° C., for 5 minutes, under a pressure of 10 MPa.

The obtained product shows a value of extensional modulus comprised within the range of from 1.8 to 2.1 GPa, and a value of tensile strength comprised within the range of from 50 to 55 MPa, with an increase of 20-25% as referred to pristine polycarbonate. The value of elongation at break is comprised within the range of from 4 to 3%.

We claim:

1. Thermoplastic copolyester having a nematic structure of the liquid-crystalline phase, with temperatures of transition from the crystal phase to the nematic mesophase comprised within the range of from 140° to 230° C., containing in its macromolecule units from:

(a) a saturated aliphatic α,ω-bicarboxy acid:

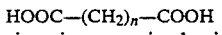
HOOC—(CH$_2$)$_n$—COOH wherein n is comprised within the range of from 3 to 8;
(b) 4,4'-dihydroxy-biphenyl;

(c) p-hydroxy-benzoic acid:

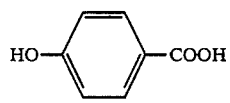

(d) 2,6-hydroxy-naphthoic acid:

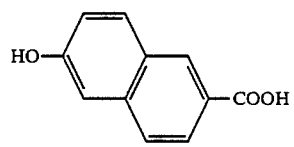

within the following ratios of said units to one another:
(a)/(b)=1;
[(c)+(d)]/(a)=1-8;
(d)/[(c)+(d)]=0.1-1.

2. Thermotropic copolyester according to claim 1, having the following ratios of units:
(a)/(b)=1;
[(c)+(d)]/(a)=2-6
(d)/[(c)+(d)]=0.2-0.6.

3. Thermotropic copolyester according to claim 1, characterized in that the (a) component is selected from among sebacic acid, suberic acid or adipic acid.

4. Thermotropic copolyester according to claim 3, characterized in that said (a) component is adipic acid.

5. Thermotropic copolyester according to claim 1, having an intrinsic viscosity comprised within the range of from 1.5 to 5 dl/g when determined at 60° C. in solution in pentafluorophenol at a concentration of 0.1 g/dl 6. Process for preparing the thermotropic copolyester according to any one of claims from 2 - 5 and 1, characterized in that a mixture of a saturated aliphatic bicarboxy acid as defined in claim 1, a 4,4'-diacyloxybiphenyl, a p-acyloxybenzoic acid and a 2,6-acyloxynaphthoic acid is polymerized in the molten state at temperatures increasing from about 190° C. up to about 290° C., for a time within the range of from 3 to 11 hours, in the presence of an amount of from 0.01 to 1 parts by weight, per each 100 parts by weight of monomers, of a catalyst selected from among dialkyl-tin oxides, diaryl-tin oxides, antimony dioxide, and alkali metal or alkali-earth metal carboxylates, with the carboxy acid obtained as a reaction byproduct being removed.

7. Process according to claim 6, characterized in that the 4,4'-diacyloxy-biphenyl is 4,4'-diacetoxybiphenyl, the p-acyloxybenzoic acid is p-acetoxybenzoic acid, the catalyst is sodium acetate and the polymerization is carried out in molten phase at temperatures increasing from about 190° C. up to about 270° C., for a time of from 5 to 7 hours.

8. Process according to claim 7, characterized in that 4,4'-diacetoxy-biphenyl, p-acetoxy-benzoic acid and 2,6-acetoxy-naphthoic acid are formed by means of the reaction of acetin anhydride with 4,4'-dihydroxybiphenyl, with p-hydroxy-benzoic acid and with 2,6-hydroxy-naphthoic, acid by heating to about 140° C., prior to the polymerization, within the same polymerization medium.

9. The process according to claim 6, characterized in that the polymerization product, at the end of the polymerization, is submitted to a thermal treatment at temperatures lower than the melting temperatures of the polymerization product copolyester, under reduced pressures.

10. Process according to claim 9, wherein said thermal treatment is carried out at a temperature comprised within the range of from 130° C. up to 210° C., for a time comprised within the range of from 1 to 20 hours.

11. The process of claim 9, wherein said thermal treatment is performed in the presence of an inert and anhydrous gas.

12. A composition comprising a thermoplastic material and the copolyester of claim 1 as reinforcing material.

* * * * *